United States Patent
Ngai et al.

(10) Patent No.: US 10,817,343 B2
(45) Date of Patent: Oct. 27, 2020

(54) PROVISIONING OF DEVICES

(71) Applicant: PayPal, Inc., San Jose, CA (US)

(72) Inventors: Alan Honkwan Ngai, Santa Clara, CA (US); Connie W. Yang, Saratoga, CA (US); Taiping Yu, San Jose, CA (US); Timothy Gordon Kimmet, San Jose, CA (US); Jean-Christophe Martin, San Jose, CA (US); Jian Xu, Shanghai (CN); Xin Li, Shanghai (CN); Jiang Xu, Shanghai (CN); Rami El-Charif, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 15/974,620

(22) Filed: May 8, 2018

(65) Prior Publication Data

US 2019/0050267 A1 Feb. 14, 2019

Related U.S. Application Data

(63) Continuation of application No. 13/531,080, filed on Jun. 22, 2012, now Pat. No. 9,965,332.

(60) Provisional application No. 61/648,955, filed on May 18, 2012.

(51) Int. Cl.
*G06F 15/16* (2006.01)
*G06F 9/50* (2006.01)

(52) U.S. Cl.
CPC .................. *G06F 9/5072* (2013.01)

(58) Field of Classification Search
CPC ....................................... G06F 15/16

USPC ......................................... 709/201
See application file for complete search history.

(56) References Cited

U.S. PATENT DOCUMENTS

| 9,965,332 B2 | 5/2018 | Ngai et al. | |
| 2003/0154271 A1 | 8/2003 | Baldwin et al. | |
| 2006/0072505 A1* | 4/2006 | Carrillo | H04L 41/042 370/331 |
| 2008/0080389 A1* | 4/2008 | Hart | H04L 41/12 370/252 |
| 2009/0292799 A1* | 11/2009 | Eisener | H04W 4/08 709/223 |

(Continued)

OTHER PUBLICATIONS

Entire Prosecution History of U.S. Appl. No. 13/531,080, titled Provisioning of Devices, filed Jun. 22, 2012.

*Primary Examiner* — Michael Won
*Assistant Examiner* — Sibte H Bukhari

(57) ABSTRACT

A provisioning machine may receive a request that an application be executed while distributed according to a distribution constraint among various devices. The provisioning machine may access a topological model that represents multiple devices configured as a single cloud-based application server and defines a first group of devices that have the same redundancy status (e.g., active or backup). In addition, the topological model may define a second group of devices that have the same functional role (e.g., executing a particular component of the application). A device may be a member of both the first group and the second group. The provisioning machine may determine a size of the first group according to the distribution constraint. Based on the determined size of the first group, the provisioning machine may configure (e.g., provision) the first group of devices as a subset of the multiple devices of the server.

20 Claims, 9 Drawing Sheets

(56) References Cited

U.S. PATENT DOCUMENTS

2010/0246443 A1* 9/2010 Cohn ............... H04L 12/4641
370/255
2013/0311539 A1 11/2013 Ngai et al.

* cited by examiner

US 10,817,343 B2

PROVISIONING OF DEVICES

CROSS REFERENCED TO RELATED APPLICATIONS

This application is a continuation of U.S. application Ser. No. 13/531,080, filed on Jun. 22, 2012, and issued as U.S. Pat. No. 9,965,332 on May 8, 2018, which claims the benefit of priority of U.S. Provisional Application Ser. No. 61/648,955 filed May 18, 2012, the contents of which are incorporated by reference in their entirety.

TECHNICAL FIELD

The subject matter disclosed herein generally relates to the processing of data. Specifically, the present disclosure addresses systems and methods of provisioning devices.

BACKGROUND

A device (e.g., a machine) may be configured to perform a function. For example, a device may be configured to load and execute one or more applications (e.g., software applications) that cause the device to perform one or more functions. As another example, a device may be configured by setting one or more parameters (e.g., its network address, its role in a multi-device system, an address of an upstream or downstream device, an address of a server device or client device, or a quality of service) that fully or partially specify one or more functions to be performed by the device.

The configuring of a device is sometimes referred to as "provisioning" the device. An example of provisioning includes causing the device to download software (e.g., a software application, an operating system, or any suitable combination thereof) and begin operating under full or partial control of the downloaded software.

In some situations, one device may configure (e.g., provision) another device. For example, a device may execute network management software that configures the device to provision multiple devices connected thereto by one or more networks. In this sense, the device may function as a manager or controller that provisions all or part of a network of multiple devices.

BRIEF DESCRIPTION OF THE DRAWINGS

Some embodiments are illustrated by way of example and not limitation in the figures of the accompanying drawings.

DETAILED DESCRIPTION

Figure 1:
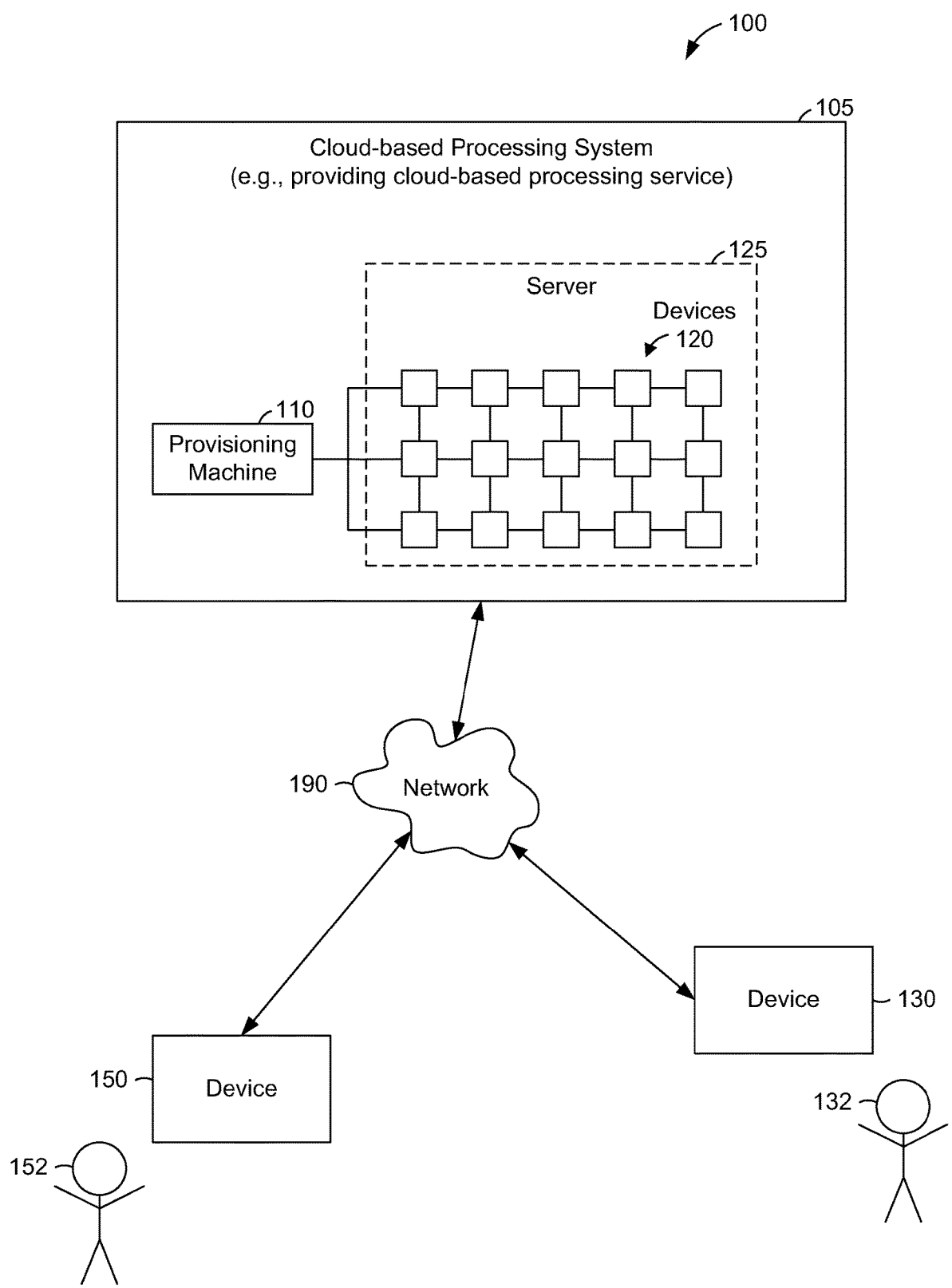
FIG. 1 is a network diagram illustrating a network environment suitable for provisioning of devices, according to some example embodiments.

Example methods and systems are directed to provisioning one or more devices. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A provisioning machine (e.g., a computer system) may be configured (e.g., by software) to provision one or more devices among a group of available devices that are communicatively coupled to the provisioning machine. The group of available devices may form all or part of a server (e.g., a single cloud-based server) that is configurable to execute an application (e.g., a software application, an applet, an app, a widget) that is distributable across multiple devices within the server. For example, the application may manage a data archive and therefore include a storage component (e.g., module) executing on one device to store data records, an index component executing on another device to index the data records, and a search component executing on a further device to provide a search engine for users to identify and retrieve various data records. Accordingly, the application may be distributed across three devices, namely, one device for executing the storage component, one device for executing the index component, and one device for executing the search component.

In some situations (e.g., periods of heavy usage by users), the application may be provisioned across more devices to maintain acceptable performance, for example, ten devices for executing the storage component, two devices for executing the index component, and four devices for executing the search component. Moreover, the application may be provisioned across additional devices for purposes of providing redundancy (e.g., failover protection) in the event one or more devices executing a component of the application suddenly or unexpectedly fail. In other situations, (e.g., periods of light usage or when less redundancy is needed), the application may be provisioned across fewer devices. Accordingly, it may be helpful that the provisioning machine be configured to provision devices in a scalable (e.g., sizable or resizable) manner.

Hence, the provisioning machine may be configured to size or resize a group of devices that are executing an application, and this sizing or resizing may be based on a distribution constraint received in a request that is initiated by the application. Specifically, the provisioning machine may receive a request that an application be executed while distributed according to a distribution constraint among various devices (e.g., devices that are unspecified in the request). That is, the request may provide (e.g., specify or include) a distribution constraint according to which the application is requested to be distributed. The request may be initiated from the application (e.g., executing on one or more devices).

The provisioning machine may access a topological model (e.g., a database or map that models devices that are executing the application, available for executing the application, or both). This topological model may represent multiple devices configured as a single server (e.g., cloud-based application server). Furthermore, the topological model may define a first group of devices (e.g., among the multiple devices of the server) that have the same redundancy status (e.g., active or backup) with respect to the application. In addition, the topological model may define a second group of devices that have the same functional role (e.g., executing a particular component of the application) with respect to the application. The first group and the second group may intersect, and a device (e.g., a particular device) may be a member of both the first group and the second group.

The provisioning machine may determine a size (e.g., a new size, a resized size, a modified size, a scaled up size, or a scaled down size) of the first group according to the distribution constraint received with the request. Based on the determined size of the first group, the provisioning machine may configure (e.g., provision) the first group of devices as a subset of the multiple devices of the server (e.g., the single server). Accordingly, the first group may be sized (e.g., resized or scaled up or down) according to the distribution constraint contained in the request from the application itself. This may have the effect of allowing a cloud-based application to fully or partially control allocation of server resources to its execution by providing one or more distribution constraints within the request.

FIG. 1 is a network diagram illustrating a network environment 100 suitable for provisioning of devices, according to some example embodiments. The network environment 100 includes a cloud-based processing system 105 and devices 130 and 150, all communicatively coupled to each other via a network 190.

The cloud-based processing system 105 may provide a cloud-based processing service (e.g., an application execution service or an application hosting service), and the cloud-based processing system 105 may include a provisioning machine 110, as well as devices 120 (e.g., multiple devices) that are configurable (e.g., collectively or individually) to execute one or more applications in a distributed manner (e.g., distributed across a subset of the devices 120). As shown in FIG. 1, the devices 120 may form all or part of a server 125. The server 125 may be a single server (e.g., a single virtual server that behaves toward device 130 and 150 as if the server 125 is a single machine or device configured as a server). Moreover, the server 125 may be a cloud-based server (e.g., available and configurable to execute one or more applications in a cloud environment). The provisioning machine 110, the devices 130 and 150, and the devices 120 may each be implemented in a computer system, in whole or in part, as described below with respect to FIG. 9.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines illustrated in FIG. 1 may be combined into a single machine, and the functions described herein for any single machine may be subdivided among multiple machines.

The network 190 may be any network that enables communication between machines (e.g., the provisioning machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
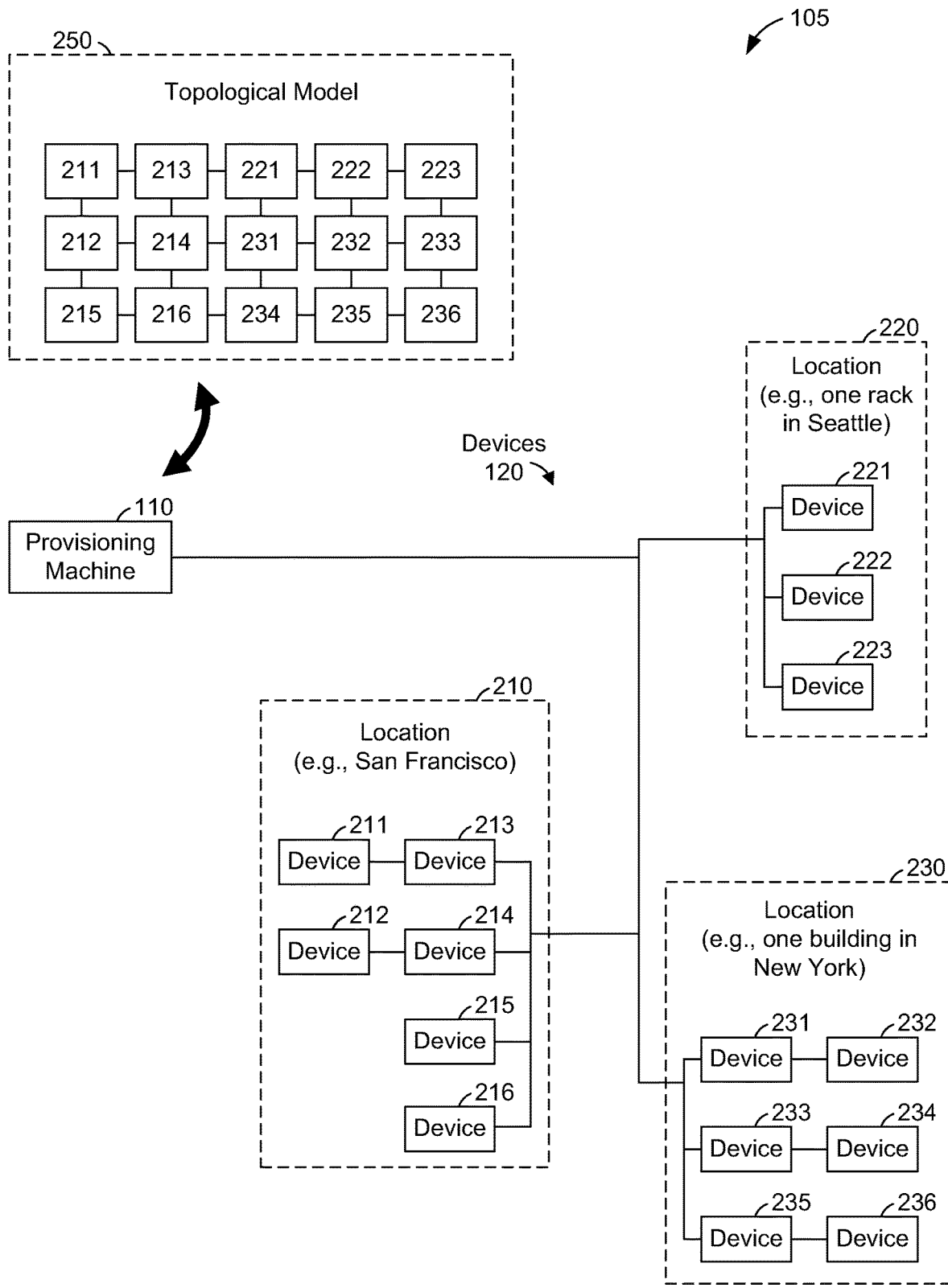
FIG. 2 is a system diagram illustrating a cloud-based processing system suitable for provisioning of devices, according to some example embodiments.

FIG. 2 is a system diagram illustrating the cloud-based processing system 105, according to some example embodiments. As noted above, the cloud-based processing system 105 includes the provisioning machine 110 and the devices 120. The devices 120 may be physically (e.g., geographically) distributed among multiple locations. In the example shown, the devices 120 may include devices 211-216 at a location 210 (e.g., San Francisco), devices 221-223 at another location 220 (e.g., one rack of hardware in Seattle), and devices 231-236 at yet another location 230 (e.g., one building in New York). Within each location, the devices may be communicatively coupled to each other (e.g., by a local network), and the locations 210, 220, and 230 may be communicatively coupled to each other and to the provisioning machine 110 (e.g., by one or more networks).

As denoted by the heavy double arrow, the provisioning machine 110 may access a topological model 250 of the server 125. The topological model 250 may represent (e.g., be or include a representation of) some or all of the devices 120 within the server 125. According to various example embodiments, the topological model 250 may be generated, maintained (e.g., updated), and stored by the cloud-based processing system 105 (e.g., by the provisioning machine 110, by one or more of the devices 120, by another machine within the cloud-based processing system 105, or any suitable combination thereof). As shown in FIG. 2, the topological model 250 represents the devices 211, 212, 213, 214, 215, 216, 221, 222, 223, 231, 232, 233, 234, 235, and 236. Moreover, the topological model 250 may represent the devices 211-236 with or without representations of connectivity relationships among the devices 120 (e.g., an indication that the device 211 is communicatively coupled directly to the device 213).

Figure 3:
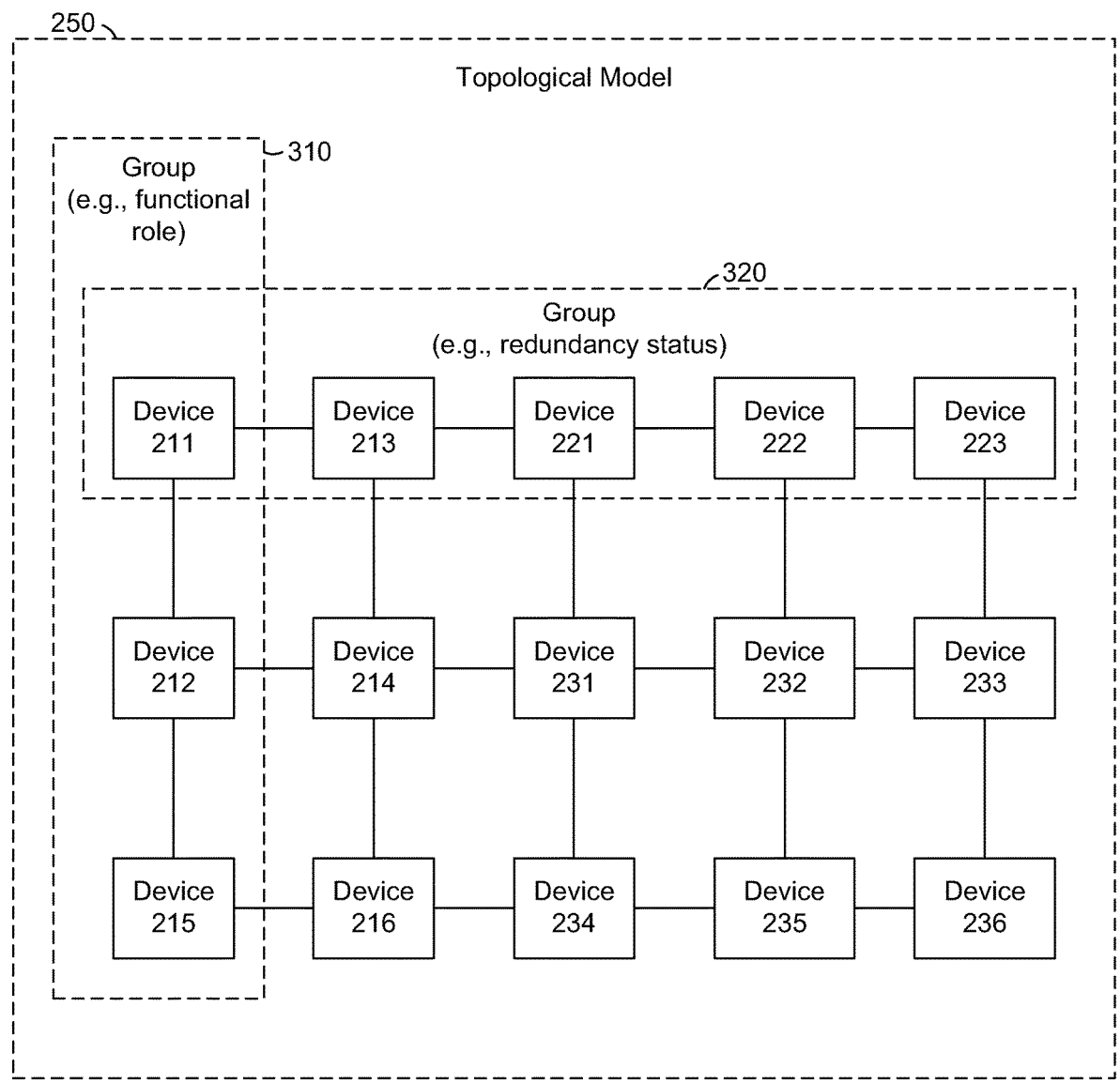
FIG. 3-4 are conceptual diagrams illustrating a topological model of a server in the cloud-based processing system, according to some example embodiments.
Figure 4:
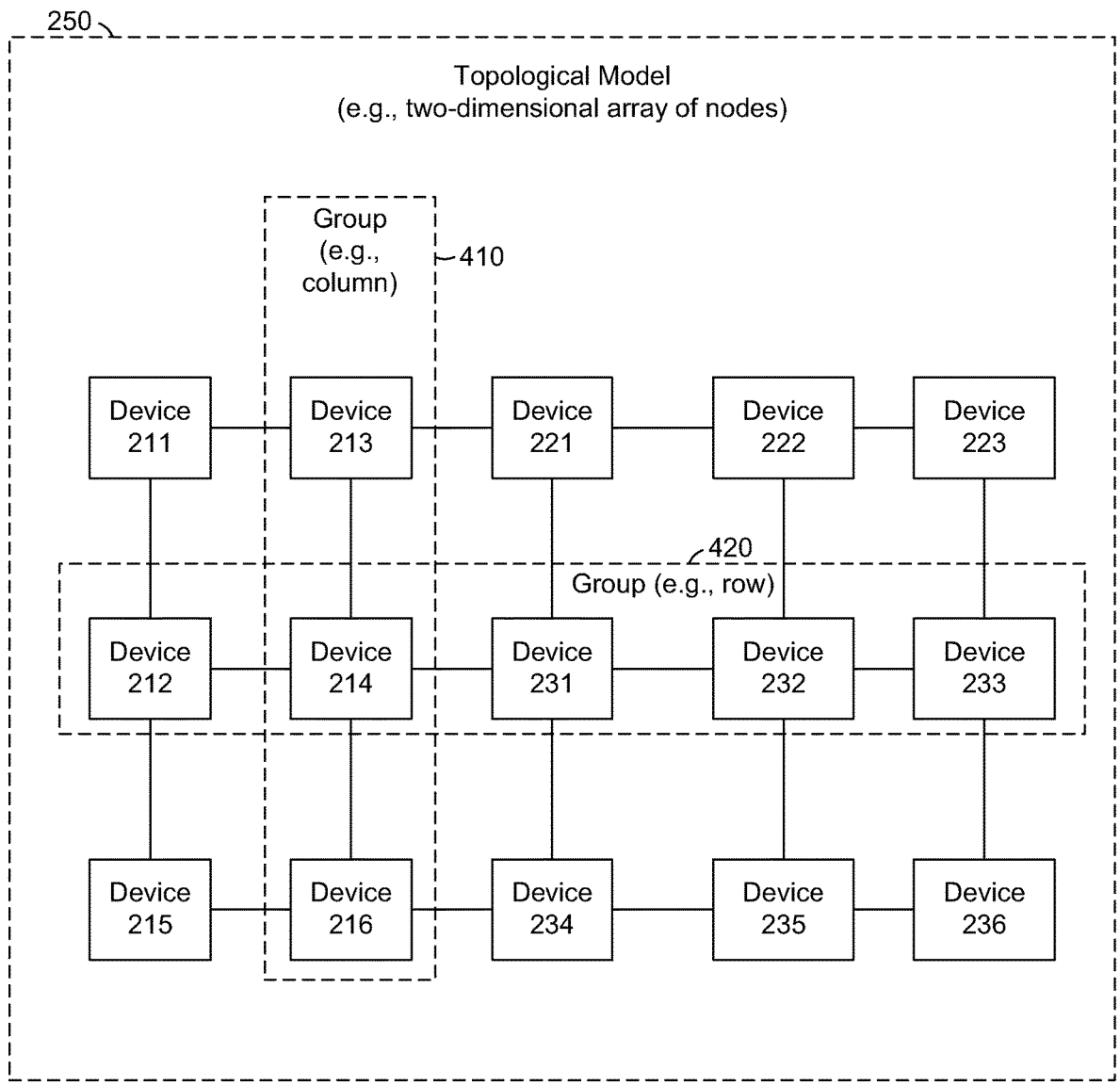

FIG. 3-4 are conceptual diagrams illustrating the topological model 250 of the server 125 in the cloud-based processing system 105, according to some example embodiments. As noted above, the topological model 250 may represent the devices 120 (e.g., devices 211-236). In addition, the topological model 250 may represent one or more groups of devices. In the example shown in FIG. 3, a group 310 may be represented in the topological model 250 as a set of devices that have a functional role shared in common (e.g., executing a particular component of an application). As another example, a group 320 may be represented in the topological model 250 as a set of devices that have a redundancy status shared in common (e.g., actively executing, primary backup, or secondary backup). As shown in FIG. 3, the group 310 includes the devices 211, 212, and 215, which may all be provisioned to have the same functional role (e.g., executing a storage component or executing a search component). FIG. 3 also shows the group 320 as including the devices 211, 213, 221, 222, and 223, which may all be provisioned to have the same redundancy status (e.g., actively executing their respectively provisioned software). The groups 310 and 320 may intersect. As shown in FIG. 3, the device 211 is included in both groups 310 and 320.

The topological model 250, according to various example embodiments, may represent the devices 120 as a multidimensional array of nodes. In the example shown in FIG. 4, the topological model 250 represents the devices 120 as a two-dimensional array of nodes (e.g., a two-dimensional table, chart, graph, or map of the devices 120). A group 410 may be represented in the topological model 250 as a set of devices that have the same functional role (e.g., executing a particular component of an application), and the group 410 may be represented in the topological model 250 as a column of nodes within the two-dimensional array (e.g., representing the devices 213, 214, and 216). A group 420 may be represented in the topological model 250 as a set of devices that have the same redundancy status (e.g., primary backup), and the group 420 may be represented in the topological model 250 as a row of nodes within the two-dimensional array (e.g., representing the devices 212, 214, 231, 232, and 233). The groups 410 and 420 may intersect. As shown in FIG. 4, the device 214 is included in both groups 410 and 420.

Combining the ideas of FIG. 3-4, the groups 310 and 410 may each be treated as a column of nodes in a two-dimensional array of nodes, where the column of nodes represents a set of devices that share a functional role in common. Likewise, the groups 320 and 420 may each be treated as a row of nodes in a two-dimensional array of nodes, where the row of nodes represents a set of devices that have a redundancy status shared in common. In example embodiments that represent a three-dimensional array of nodes within the topological model 250, a further row of nodes may be represented in the topological model 250, where the further row of nodes represents a set of devices that have a further attribute (e.g., hardware configuration, capabilities, location, etc.) shared in common.

Figure 5:
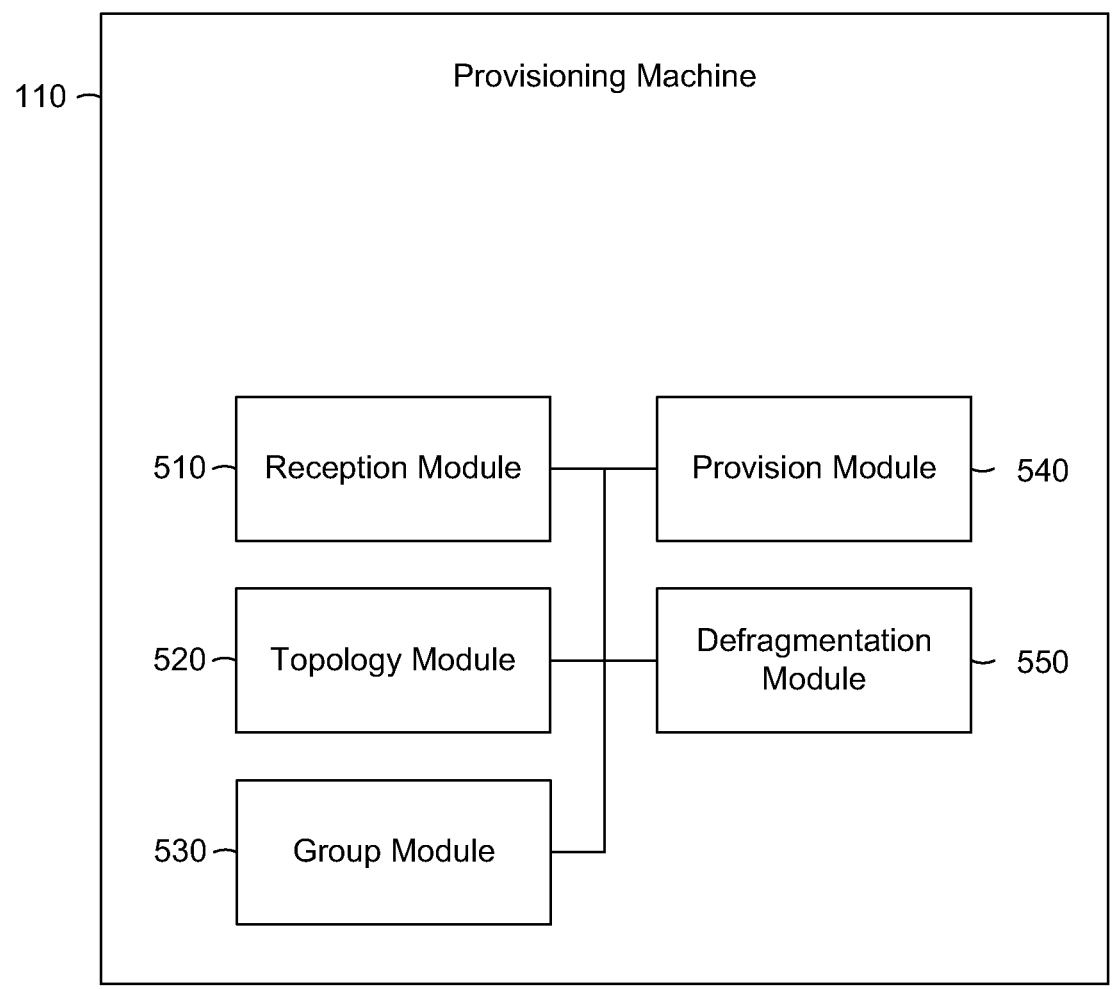
FIG. 5 is a block diagram illustrating components of a provisioning machine in the cloud-based processing system, according to some example embodiments.

FIG. 5 is a block diagram illustrating components of the provisioning machine 110 in the cloud-based processing system 105, according to some example embodiments. The provisioning machine 110 may include a reception module 510, a topology module 520, a group module 530, a provision module 540, and a defragmentation module 550, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Operations and functions of the modules of the provisioning machine 110, according to various example embodiments, are discussed below with respect to FIG. 6-8.

Figure 6:
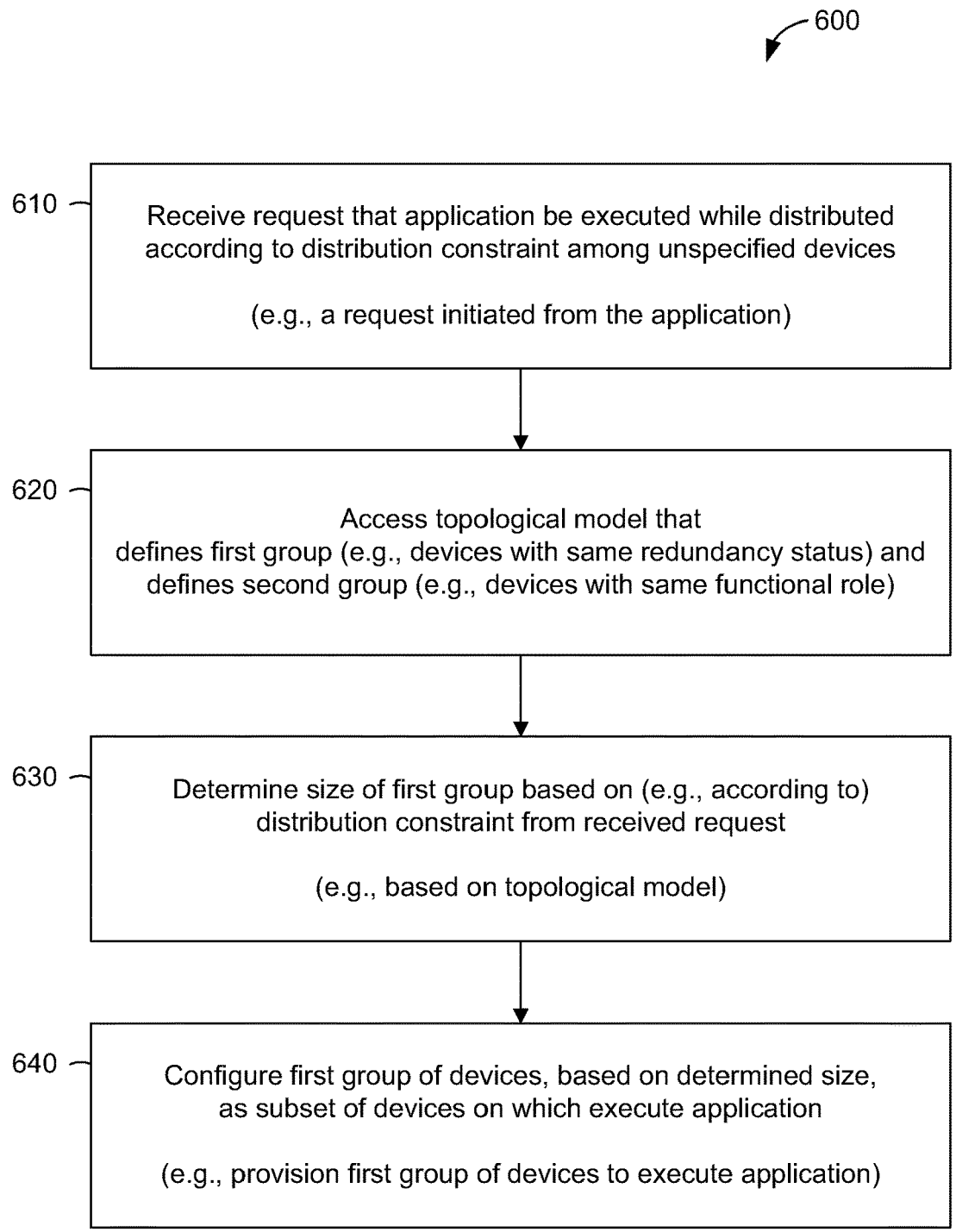
FIG. 6-8 are flowcharts illustrating operations of the provisioning machine in performing a method of provisioning devices, according to some example embodiments.
Figure 7:
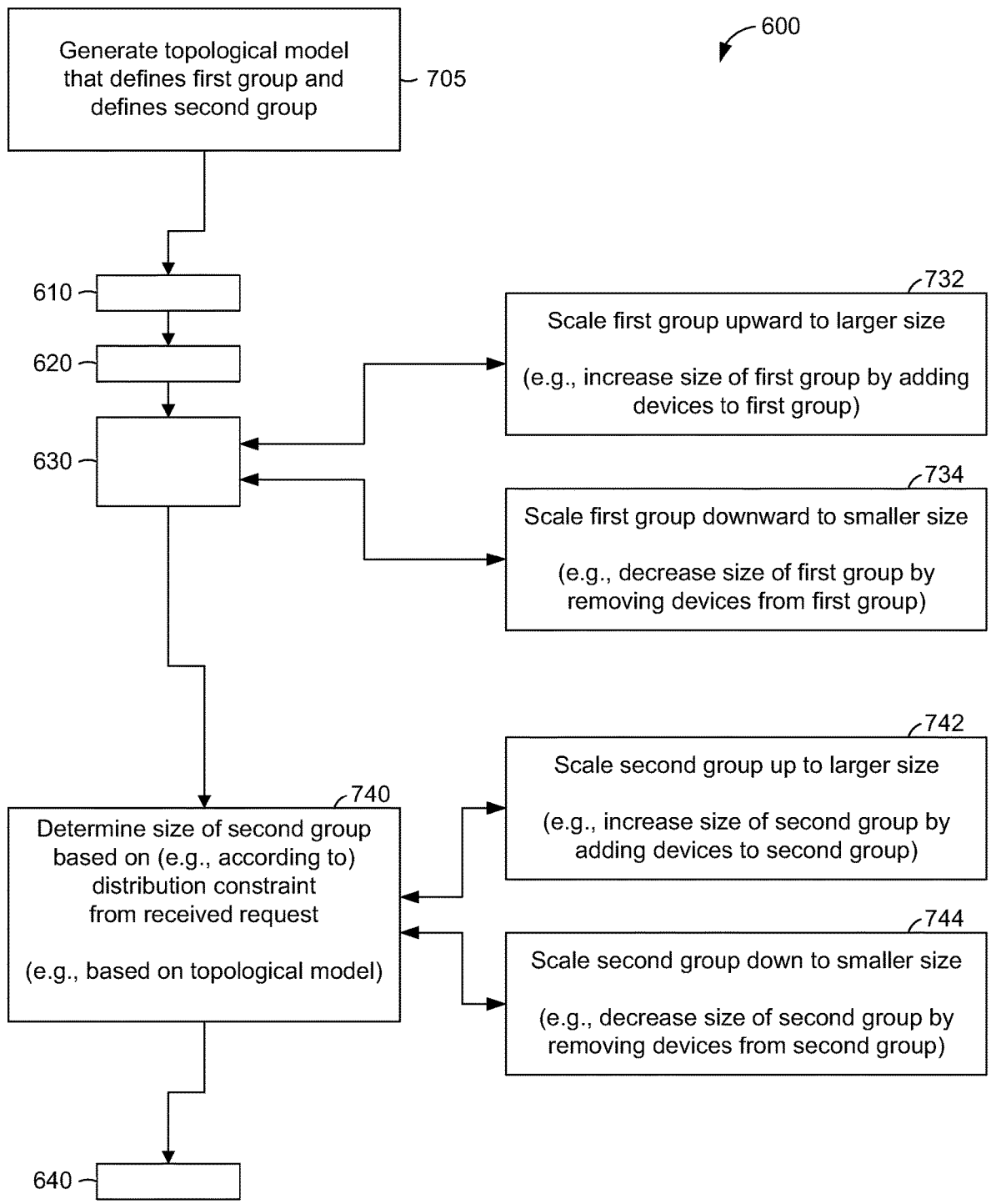
Figure 8:
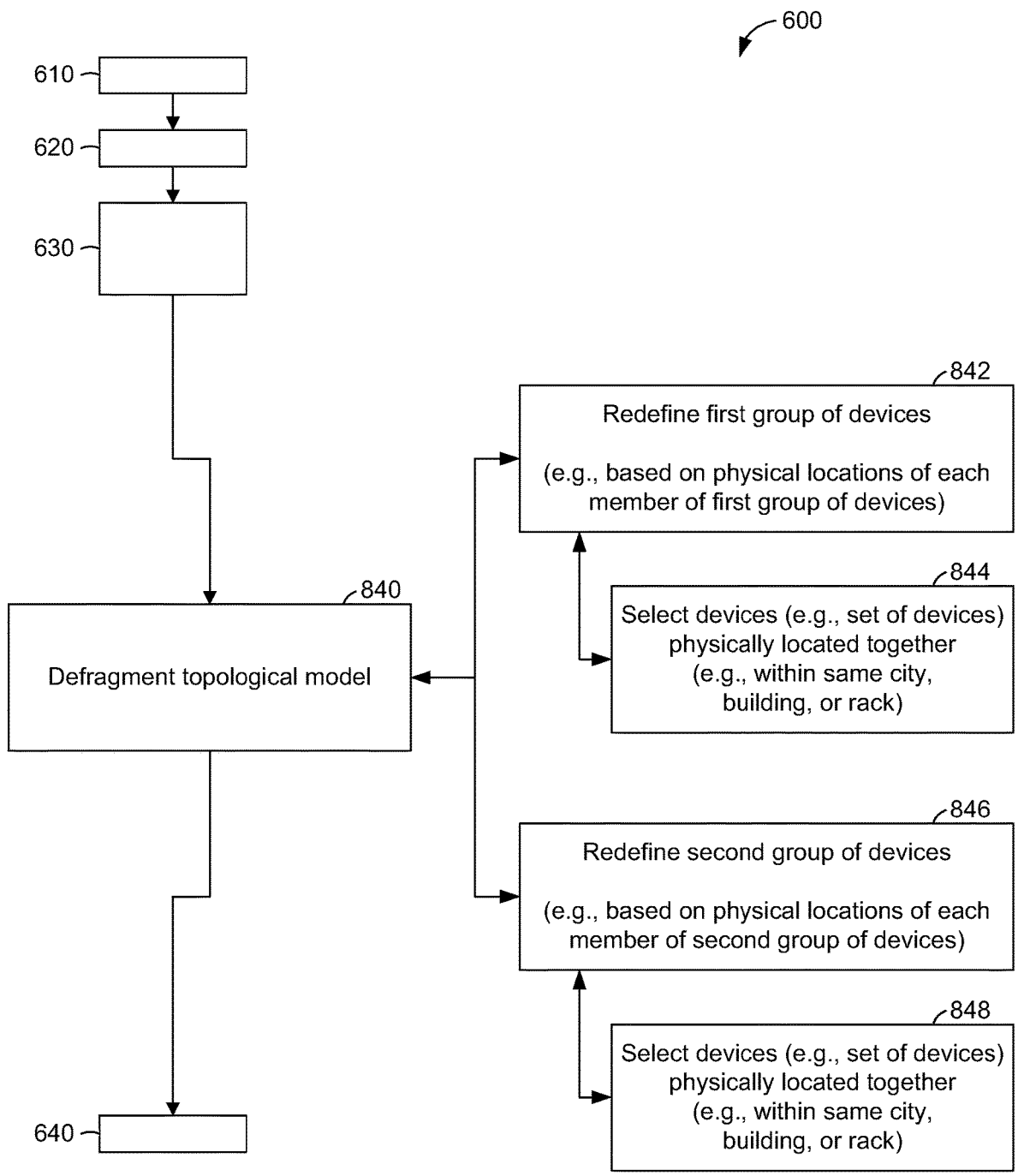

FIG. 6-8 are flowcharts illustrating operations of the provisioning machine 110 in performing a method 600 of provisioning one or more devices (e.g., one or more of the devices 120), according to some example embodiments. Operations in the method 600 may be performed by the provisioning machine 110, using modules described above with respect to FIG. 5. As shown in FIG. 6, the method 600 includes operations 610, 620, 630, and 640.

In operation 610, the reception module 510 receives a request that an application be executed while distributed according to a distribution constraint among devices available for provisioning, at least some of which are unspecified in the request. The request may be initiated by the application (e.g., while the application is executing on all or part of the server 125), and the request may be received from one or more of the devices 120 within the server 125. For example, the request may be a request to increase the number of devices provisioned to execute the application (e.g., a request to scale up a group of devices executing the application), with a distribution constraint that the provisioned devices be assigned their functional roles according to one or more ratios (e.g., twice as many devices executing one component of the application as devices executing another component of the application). As another example, the request may be a request to decrease the number of devices provisioned to execute the application (e.g., a request to scale down the group of devices executing the application), with a distribution constraint that the provisioned devices be assigned their redundancy status as according to one or more ratios (e.g., one backup device for every three devices actively executing a component of the application).

A distribution constraint may have any level of complexity. A distribution constraint may specify one or more minimum number of devices to be assigned a functional role (e.g., at least one device to execute a search component of an application), one or more maximum number of devices to be assigned a functional role (e.g., no more than 100 devices to execute the search component of the application), one or more ratios of devices to be assigned a functional role (e.g., three devices executing a storage component of the application for every one device executing an index component of the application), or any suitable combination thereof. A distribution constraint may specify one or more minimum number of devices to be assigned a redundancy status (e.g., at least 30 devices actively executing a storage component of the application, or at least one device provisioned as a primary backup device to execute an index component of the application), one or more maximum number of devices to be assigned a redundancy status (e.g., no more than 20 devices provisioned as secondary backups to execute the index component of the application, one or more ratios of devices to be assigned a redundancy status (e.g., one device provisioned as a primary backup to execute a storage component of the application for every four devices provisioned to actively execute the storage component), or any suitable combination thereof.

Moreover, a distribution constraint may specify minimums, maximums, ratios, or any suitable combination thereof, for combinations of functional roles and redundancy statuses (e.g., a 15:1:3 ratio of devices provisioned to execute a storage component, an index component, and a search component of an application, with at least two devices provisioned for each component and no more than 100 devices provisioned for any component). Furthermore, a distribution constraint may specify one or more limitations that are conditioned (e.g., dependent) on time (e.g., double the default number of devices on Tuesdays and Wednesdays, and reduce the default number of devices on Sundays), availability of unprovisioned devices (e.g., if more than 10 unprovisioned devices are available, provision one additional device as a secondary backup for executing a storage component of the application), or any suitable combination thereof.

The request may specify no devices on an individual basis. That is, the request may specify that the application (e.g., the various components of the application) be allocated to unspecified (e.g., unnamed or unidentified) devices somewhere among the devices 120 of the server 125. For example, the request may ask that any 10 available devices among the devices 120 be allocated to execute the application (e.g., six devices to actively execute the application, three devices as primary backups, and one device as secondary backup).

In some example embodiments, however, the request may specify one or more individual devices to be included in the allocation of devices to execute the application. For example, the request may ask that the device 211 and any nine additional devices among the devices 120 be allocated to execute the application (e.g., device 211 to actively execute an index component of the application, one device to be a backup of the device 211, one device to actively execute a search component of the application, one device to be a backup of the device actively executing the search component, four devices to actively execute a storage component of the application, and two devices to be backups of the devices actively executing the storage component).

Accordingly, as used herein, a "distribution constraint" is a rule or condition that constrains the distribution of an application (e.g., the distribution of the components of the application) across a group of devices collectively provisioned to execute the application, actively or as a backup device. A distribution constraint may specify one or more functional roles, one or more redundancy statuses, or any combination thereof, for the group of devices. A functional role of a device or group of devices may indicate a computational function with respect to the application (e.g., one or more processing or calculating functions), a storage function with respect to the application (e.g., one or more storing, maintaining, or updating functions), a communication function with respect to the application (e.g., one or more accessing, receiving, reading, writing, providing, or presenting functions), or any suitable combination thereof. A redundancy status of a device or a group of devices may indicate active execution of the application or one or more components thereof, or provision of redundancy (e.g., primary, secondary, tertiary, etc.) for one or more devices that are provisioned to execute the application or one or more components thereof (e.g., for one or more devices actively executing the application or one or more of its components).

The request received in operation 610 may include, indicate, specify, or refer to one or more distribution constraints. Since the request may be initiated by the application itself, this may have the effect of allowing an application to provide one or more distribution constraints to the cloud-based processing system 105 within a request for an increase or reduction in resources (e.g., devices among the devices 120). Hence, an application executing on the server 125 may request that the resources allocated to its various components be scaled up or down in a balanced manner. Such a request may be initiated by the application in response to changes in load, usage, latency, processor consumption, or other performance metric of the application (e.g., as detected by the application itself or by an external performance monitoring service, application, or operating system component).

In operation 620, the topology module 520 accesses the topological model 250. As noted above, the topological model 250 may represent the devices 120, which may be configured as the server 125 (e.g., a single cloud-based server). As noted in examples given above, the topological model 250 may define the groups 310 and 320 of devices, where the group 320 is a first group of devices (e.g., devices 211, 213, 221, 222, and 223) having a redundancy status shared in common with each other, and where the group 310 is a second group of devices (e.g., devices 211, 212, and 215). Similarly, topological model 250 may define the groups 410 and 420 of devices, where the group 420 is a first group of devices (e.g., devices 212, 214, 231, 232, and 233) that share a redundancy status in common with each other, and where the group 410 is a second group of devices (e.g., devices 213, 214, and 216) that share a functional role in common with each other.

In operation 630, the group module 530 determines a size (e.g., a new size, a resized size, a scaled up size, or a scaled down size) of the first group of devices discussed above with respect to operation 620. For example, the group module 530 may determine a size of the group 320. As another example, the group module 530 may determine a size of the group 420. The determining of the size of this first group (e.g., group 320 or group 420) may be based on (e.g., performed according to) the distribution constraint discussed above with respect to operation 610, based on the topological model 250 accessed in operation 620, or both.

As an example, the request received in operation 610 may include a distribution constraint specifying that a ratio of devices respectively executing a storage component, an index component, and a search component of the application be 3:1:1, and the group module 530 may determine the size of the group 320 to be five devices (e.g., three devices to actively execute the storage component, one device to actively execute the index component, and one device to actively execute the search component). As another example, the distribution constraint may specify a 1:1 ratio of actively executing devices to primary backup devices, and the group module 530 may determine a size of the group 420 to be five devices (e.g., three devices as primary backups of the three devices provisioned to actively execute the storage component, one device as a primary backup of the device provisioned to actively execute the index component, and one device as a primary backup of the device provisioned to actively execute the search component). Hence, the distribution constraint may specify a relationship between the size of the first group and the size of the second group (e.g., a ratio of the size of the first group to the size of the second group, or a ratio of the size of the first group to the size of the second group and the size of a third group of devices).

In operation 640, the provision module 540 configures the first group of devices (e.g., group 320 or group 420). The configuration of the first group may be based on the size of the first group, as determined in operation 630 (e.g., 10 devices). Moreover, the configuration of the first group may be based on the distribution constraint indicated in the request received in operation 610.

For example, where the distribution constraint specifies a ratio of 3:1:1 for devices executing a storage component, an index component, and a search component of the application, the provision module 540 may configure the group 320 by provisioning five devices among the devices 120, with three devices provisioned to execute the storage component (e.g., devices 211, 213, and 221), one device provisioned to execute the index component (e.g., device 222), and one device provisioned to execute the search component (e.g., device 223). Accordingly, in such an example, these five devices among the devices 120 may be a subset of the devices 120, and the subset may be configured (e.g., collectively) to execute the application in a distributed manner. As another example, where the distribution constraint specifies a 1:1 ratio of actively executing devices to primary backup devices, the provision module 540 may configure the group 420 by provisioning five devices among the devices 120, with three devices provisioned as the primary backups of the three devices provisioned to actively execute a storage component, one device provisioned as the primary backup of the device provisioned to actively execute the index component, and one device provisioned as the primary backup of the device provisioned to actively execute the search component. Since the first group of devices (e.g., the group 320 or group 420) shares a redundancy status (e.g., active execution) in common with each other, the sizing or resizing of the first group may have the effect of expanding or contracting the number of devices among the devices 120 that are collectively provisioned to execute the application.

As shown in FIG. 7, the method 600 may include one or more of operations 705, 732, 734, 740, 742, and 744. Operation 705 may be performed prior to operation 610. In operation 705, the topology module 520 generates the topological model 250. Generation of the topological model 250 may be performed as part of one or more maintenance operations with respect to the server 125 within the cloud-based processing system 105. As noted above, the topological model 250 may define a first group of devices (e.g., group 320 or group 420) as each having a redundancy status shared in common, and the topological model 250 may define a second group of devices (e.g., group 310 or group 410) as each having a functional role shared in common. Accordingly, the topology module 520 may generate, maintain, update, and access the topological model 250 as appropriate in performing the method 600.

Each of operations 732 and 734 may be performed as part (e.g., a precursor task, a subroutine, or a portion) of operation 630, in which the group module 530 determines the size (e.g., a new or scaled size) of the first group of devices (e.g., group 320 or group 420). In operation 732, the group module 530 scales the first group upwards (e.g., from an unscaled size to a scaled size that is larger than the unscaled size). This may have the effect of expanding the first group in size, as indicated by the number of devices within the first group. For example, the distribution constraint specified in the request received in operation 610 may specify that the first group is to be increased in size from three devices to five devices (e.g., in response to an increase in usage, demand, or activity of the application). In accordance with such a distribution constraint, the group module 530 may scale the first group from three devices to five devices (e.g., devices 211, 213, 221, 222, and 223). This may have the effect of increasing the size of the first group by adding one or more devices to the first group.

In operation 734, the group module 530 scales the first group downwards (e.g., from an unscaled size to a scaled size that is smaller than the unscaled size). This may have the effect of shrinking the first group in size, as indicated by the number of devices within the first group. For example, the distribution constraint specified in the request received in operation 610 may specify that the first group is to be decreased in size from 10 devices to five devices (e.g., in response to a decrease in usage, demand, or activity of the application). In accordance with such a distribution constraint, the group module 530 may scale the first group from 10 devices to five devices (e.g., devices 211, 213, 221, 222, and 223). This may have the effect of decreasing the size of the first group by removing one or more devices from the first group.

Since the second group of devices (e.g., the group 310 or group 410) shares a functional role (e.g., a particular component of the application) in common with each other, the group module 530 may also affect the extent to which redundancy is provided to an application by sizing or resizing the second group of devices. This feature is included in certain example embodiments of the method 600 and is represented in FIG. 7 by operations 740, 742, and 744.

In operation 740, the group module 530 determines a size (e.g., a new size, a resized size, a scaled up size, or a scaled down size) of the second group of devices discussed above with respect to operation 620. For example, the group module 530 may determine a size of the group 310. As another example, the group module 530 may determine a size of the group 410. The determining of the size of the second group (e.g., group 310 or group 410) may be based on (e.g., performed according to) a distribution constraint discussed above with respect to operation 610, based on the topological model 250 accessed in operation 620, or both.

As an example, the request received in operation 610 may include a distribution constraint specifying that a ratio of devices respectively provisioned to execute a particular component of the application by 1:1:1 for active execution, primary backup, and secondary backup. In such an example, the group module 530 may determine the size of the group 310 to be three devices (e.g., one device to actively execute the component, one device provisioned as the primary backup, and one device provisioned as a secondary backup).

In example embodiments that include operation 740, the provision module 540 may configure the second group of devices (e.g., group 310 or group 410) in a manner similar to that described above with respect to operation 640. In some example embodiments, operation 640 is performed by the provision module 540 by configuring both the first group of devices (e.g., group 320 or group 420) and the second group of devices (e.g., group 310 or group 410). In other example embodiments, the configuring of the second group of devices (e.g., group 310 or group 410) is performed in a separate operation within the method 600.

Each of operations 742 and 744 may be performed as part (e.g., a precursor task, a subroutine, or a portion) of operation 740, in which the group module 530 determines the size (e.g., a new or scaled size) of the second group of devices (e.g., group 310 or group 410). In operation 742, the group module 530 scales the second group upwards (e.g., from an unscaled size to a scaled size that is larger than the unscaled size). This may have the effect of expanding the second group in size, as indicated by the number of devices within the first group. For example, the distribution constraint specified in the request received in operation 610 may specify that the second group is to be increased in size from two devices to three devices (e.g., in response to an increase in usage of the application or a real or perceived decrease in reliability or confidence in the devices 120, such as a security alert or intermittent power failures). In accordance with such a distribution constraint, the group module 530 may scale the second group from two devices to three devices (e.g., devices 211, 212, and 215). This may have the effect of increasing the size of the second group by adding one or more devices to the second group In operation 744, the group module 530 scales the second group downwards (e.g., from an unscaled size to a scaled size that is smaller than the unscaled size). This may have the effect of shrinking the second group in size, as indicated by the number of devices within the first group. For example, the distribution constraint specified in the request received in operation 610 may specify that the second group is to be decreased in size from five devices to three devices (e.g., in response to a decrease in usage of the application or a real or perceived increase in reliability or confidence in the devices 120). In accordance with such a distribution constraint, the group module 530 may scale the first group from four devices to three devices (e.g., devices 211, 212, and 215). This may have the effect of decreasing the size of the second group by removing one or more devices from the second group.

In some example embodiments, the size of the second group (e.g., as determined in operation 740) is a basis for performing operation 640, in which the provision module 540 configures the first group of devices (e.g., group 320 or group 420). For example, the distribution constraint may specify that there be at least one primary backup device and one secondary backup device for every device provisioned to actively execute a component of the application. Supposing that only three devices are available to be provisioned for execution of a particular component of the application, the group module 530 may determine the size of the second group (e.g., group 310 or group 410) as those three devices and that the size of the first group (e.g., group 320 or group 420) is limited by the availability of devices configurable as primary and secondary backups. Accordingly, the configuring of the first group of devices (e.g., group 320 or group 420) in operation 640 may be based on the output of operation 630, the output of operation 740, or both. Furthermore, according to various example embodiments, operations 630 and 740 may be combined into a single operation or performed individually in any order.

According to certain example embodiments discussed with respect to FIG. 8, the distribution constraint indicated in the request received in operation 610 may specify that the application be distributed among devices based on their physical proximity to each other. That is, the distribution constraint may specify that a group of unspecified devices be collectively provisioned to execute the application, where the group of unspecified devices is physically in the same location (e.g., location 210, location 220, or location 230). This may have the effect of requesting an improvement in performance of the cloud-based processing system 105 by consolidating (e.g., concentrating) the allocation of devices among the devices 120, based on physical location (e.g., a rack in Seattle, a building in New York, or within the city of San Francisco). Such a consolidation in the allocation of devices may be described as a "defragmentation" operation (e.g., "defragging" cloud-based resources).

As shown in FIG. 8, the method 600 may include one or more of operations 840, 842, 844, 846, and 848. Operation 840 may be performed after operation 630, in which the group module 530 determines the size of the first group (e.g., group 320 or group 420) of devices. In some example embodiments, operation 840 may be performed as part (e.g., a precursor task, a subroutine, or a portion) of operation 630.

In operation 840, the defragmentation module 550 defragments the topological model 250. Such a defragmentation operation may be performed by redefining the first group of devices (e.g., group 320 or group 420). As noted above, defragmentation of devices may be based on the physical locations of each device in the first group (e.g., devices 213, 214, and 216). For example, the first group of devices may be redefined from a pre-existing set of devices spanning multiple locations (e.g., devices 221, 213, and 231) to a new set of devices at a single location (e.g., devices 213, 214, and 216). Accordingly, the determining of the size of the first group (e.g., group 320 or group 420) may actually determine the size of the redefined first group of devices, and the configuring of the first group of devices in operation 640 may configure the redefined first group of devices.

One or more of operations 842 and 846 may be performed as part (e.g., a precursor task, a subroutine, or a portion) of operation 840, in which the defragmentation module 550 defragments the topological model 250. In operation 842, the defragmentation module 550 redefines the first group (e.g., group 320 or group 420) of devices. Operation 842 may be performed based on the physical locations of each member (e.g., each device) within the first group of devices (e.g., devices 212, 214, 231, 232, and 233). In certain example embodiments, operation 844 may be performed as part of operation 842. In operation 844, the defragmentation module 550 selects one or more devices (e.g., a set of one or more devices) that are physically located together (e.g., within the same rack, within the same building, or within the same city).

In operation 846, the defragmentation module 550 redefines the second group (e.g., group 310 or group 410) of devices. Operation 846 may be performed based on the physical locations of each member (e.g., each device) within the second group of devices (e.g., devices 213, 214, and 216). In some example embodiments, operation 848 may be performed as part of operation 846. In operation 848, the defragmentation module 550 selects one or more devices (e.g., a set of one or more devices) that are physically located together (e.g., within the same rack, within the same building, or within the same state). Accordingly, certain example embodiments of the method 600 may provision a group (e.g., a subset) of the devices 120 to execute the application in a distributed manner that is defragmented (e.g., geographically fragmented) within the cloud-based processing system 105.

According to various example embodiments, one or more of the methodologies described herein may facilitate provisioning of devices in a cloud-based processing system. In particular, one or more the methodologies described herein may enable an application to request its own repositioning across a group of devices. Moreover, one or more of the methodologies described herein may facilitate scaling up or down a group of devices configured to collectively execute an application. Furthermore, one or more the methodologies described herein may facilitate defragmentation of cloud-based resources, which may have the effect of providing performance benefits resultant therefrom.

When these effects are considered in aggregate, one or more of the methodologies described herein may obviate a need for certain efforts or resources that otherwise would be involved in provisioning devices. Efforts expended by an application developer or a cloud-based processing system administrator in identifying appropriate sizes for groups of devices to execute an application may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 9:
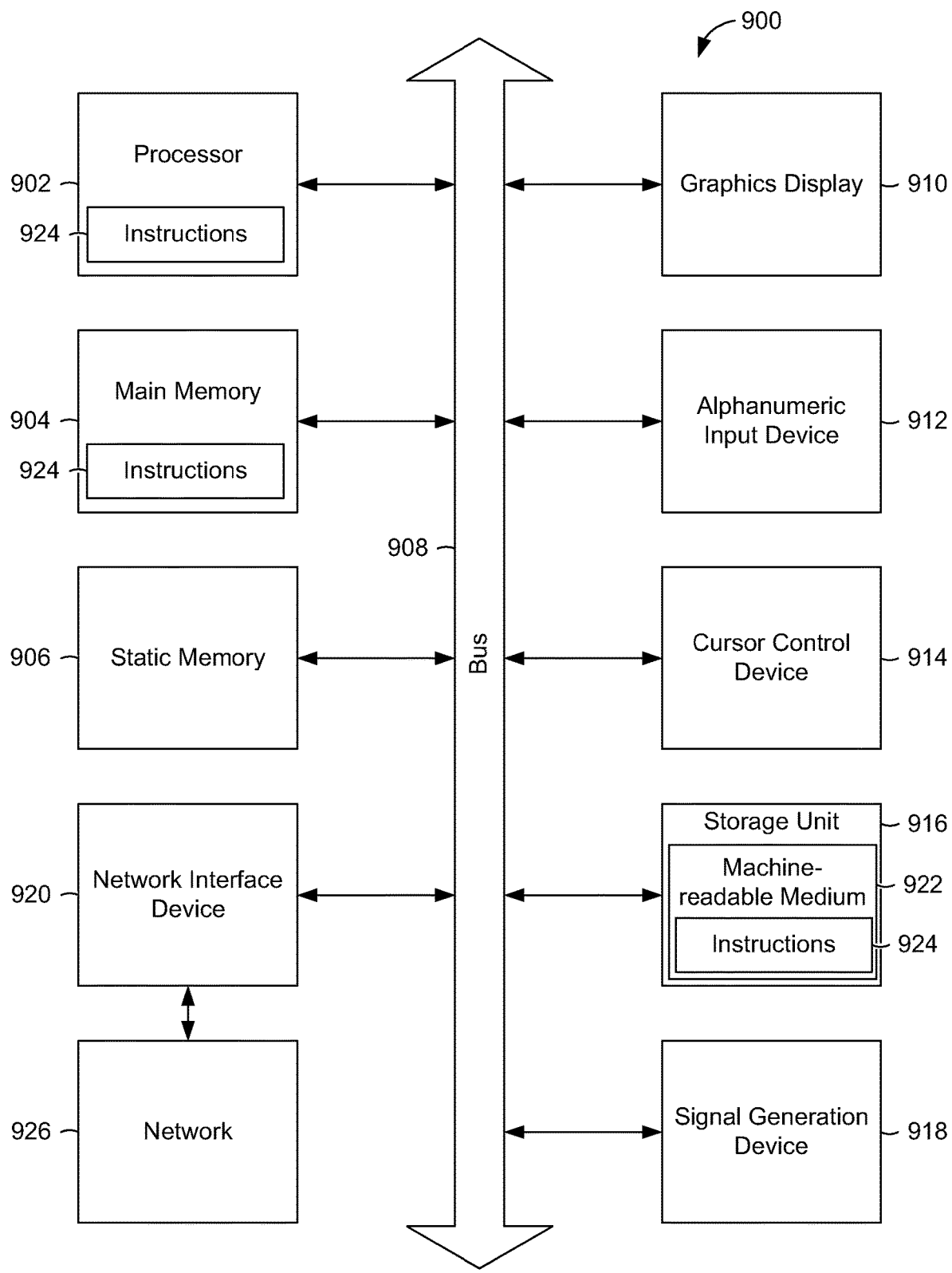
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system and within which instructions 924 (e.g., software) for causing the machine 900 to perform any one or more of the methodologies discussed herein may be executed. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light emitting diode (LED) display, a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 (e.g., software) embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 (e.g., network 190) via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following descriptions define various example embodiments of methods and systems (e.g., apparatus) discussed herein:

1. A method comprising:

receiving a request initiated from an application that the application be executed while distributed according to a distribution constraint among devices unspecified in the request, the devices being included in a plurality of devices configured as a single server that is capable of executing the application on a subset of the plurality of devices;

accessing a topological model that represents the plurality of devices configured as the single server, the topological model defining a first group of devices that includes a device among the plurality of devices and defining a second group of devices that includes the device included in the first group, the first group of devices having a redundancy status shared in common with each other, the second group of devices having a functional role shared in common with each other;

determining a size of the first group of devices according to the distribution constraint, the determining of the size being performed by a processor of a machine; and configuring the first group of devices based on the determined size as the subset of the plurality of devices on which to execute the application.

2. The method of description 1 further comprising:
generating the topological model that defines the first group of devices as each having the redundancy status and defines the second group of devices as each having the functional role.

3. The method of description 1 or description 2, wherein:
the topological model represents the plurality of devices as a two-dimensional array of nodes;
the topological model represents the first group of devices as a row of nodes within the two-dimensional array of nodes;
the topological model represents the second group of devices as a column of nodes within the two-dimensional array of nodes; and
the topological model represents the device as a node that is shared in common between the row of nodes and the column of nodes.

4. The method of any of descriptions 1-3, wherein:
the plurality of devices is configured as the single server configured to provide a cloud-based processing service capable of executing the application.

5. The method of any of descriptions 1-4, wherein:
the redundancy status indicates that the first group of devices is executing the application.

6. The method of any of descriptions 1-5, wherein:
the redundancy status indicates that the first group of devices is providing redundancy for devices that are executing the application.

7. The method of any of descriptions 1-6, wherein:
the functional role indicates that the second group of devices is configured to fulfill a computational function of the application.

8. The method of any of descriptions 1-7, wherein:
the functional role indicates that the second group of devices is configured to fulfill a storage function of the application.

9. The method of any of descriptions 1-8, wherein:
the functional role indicates that the second group of devices is configured to fulfill a communication function of the application.

10. The method of any of descriptions 1-9 further comprising:
determining a further size of the second group of devices according to the distribution constraint; and wherein
the configuring of the first group of devices as the subset of the plurality of devices is based on the determined further size of the second group of devices.

11. The method of any of descriptions 1-10, wherein:
the determining of the size of the first group of devices includes scaling the first group upwards from an unscaled size to a scaled size larger than the unsealed size.

12. The method of any of descriptions 1-11, wherein:
the determining of the size of the first group includes scaling the first group downwards from an unsealed size to a scaled size smaller than the unsealed size.

13. The method of any of descriptions 1-12, wherein:
the distribution constraint specifies a relationship between the size of the first group of devices and a further size of the second group of devices.

14. The method of any of descriptions 1-13, wherein:
the distribution constraint specifies that the devices unspecified in the request be selected based on their physical proximity to each other.

15. The method of any of descriptions 1-14 further comprising:
defragmenting the topological model by redefining the first group of devices based on physical locations of each of the first group of devices; and wherein:
the determining of the size of the first group of devices determines the size of the redefined first group of devices; and
the configuring of the first group of devices configures the redefined first group of devices.

16. The method of description 15, wherein:
the redefining of the first group of devices include selecting a set of devices that are physically located within a single rack.

17. A non-transitory machine-readable storage medium comprising instructions that, when executed by one or more processors of a machine, cause the machine to perform operations comprising:
receiving a request initiated from an application that the application be executed while distributed according to a distribution constraint among devices unspecified in the request, the devices being included in a plurality of devices configured as a single server that is capable of executing the application on a subset of the plurality of devices;
accessing a topological model that represents the plurality of devices configured as the single server, the topological model defining a first group of devices that includes a device among the plurality of devices and defining a second group of devices that includes the device included in the first group, the first group of devices having a redundancy status shared in common with each other, the second group of devices having a functional role shared in common with each other;
determining a size of the first group of devices according to the distribution constraint, the determining of the size being performed by the one or more processors of a machine; and
configuring the first group of devices based on the determined size as the subset of the plurality of devices on which to execute the application.

18. The non-transitory machine-readable storage medium of description 17, wherein the operations further comprise:
defragmenting the topological model by redefining the first group of devices based on physical locations of each of the first group of devices; and wherein:
the determining of the size of the first group of devices determines the size of the redefined first group of devices; and
the configuring of the first group of devices configures the redefined first group of devices.

19. A system comprising:
a reception module configured to receive a request initiated from an application that the application be executed while distributed according to a distribution constraint among devices unspecified in the request, the devices being included in a plurality of devices configured as a single server that is capable of executing the application on a subset of the plurality of devices;
a topology module configured to access a topological model that represents the plurality of devices configured as the single server, the topological model defining a first group of devices that includes a device among the plurality of devices and defining a second group of devices that includes the device included in the first group, the first group of devices having a redundancy status shared in common with each other, the second group of devices having a functional role shared in common with each other;
a processor configured by a group module to determine a size of the first group of devices according to the distribution constraint; and
a provision module configured to configure the first group of devices based on the determined size as the subset of the plurality of devices on which to execute the application.

20. The system of description 19 further comprising:
a defragmentation module configured to defragment the topological model by redefining the first group of devices based on physical locations of each of the first group of devices; and wherein:
the group module configures the processor to determine the size of the first group of devices by determining the size of the redefined first group of devices; and
the provision module is configured to configure the first group of devices by configuring the redefined first group of devices.

What is claimed is:

1. A method comprising:
receiving a request initiated from an application that is distributed across one or more of a plurality of processing devices arranged as a cloud-based application server to process requests from a plurality of client devices, the request including a distribution constraint that is based on a current application usage condition and that indicates that a first number of the plurality of processing devices executes a storage management functionality of the application, a second number of the plurality of processing devices executes an index functionality of the application, and a third number of the plurality of processing devices executes a search functionality of the application; and
responsive to the request, reallocating computing resources of the plurality of processing devices to meet the distribution constraint, the reallocating including:
accessing a topological model representative of the plurality of processing devices;
defining in the topological model a first subset of the plurality of processing devices, the first subset having a shared redundancy status;
defining in the topological model a second subset of the plurality of processing devices, the second subset having a shared functional role; and
reprovisioning, based on the topological model, the one or more of the plurality of processing devices across which the application is distributed such that:
the processing devices in the second subset execute any combination of one or more types of functionality from the following group of types of functionality: the storage management functionality, the index functionality, and the search functionality consistent with the distribution constraint, and
the processing devices in the first subset provide failover protection by executing any combination of one or more types of functionality from the following group of types of functionality: the storage management functionality, the index functionality, and the search functionality under the current application usage condition, in response to a failure condition detected for one of the processing devices in the second subset.

2. The method of claim 1, further comprising:
receiving a subsequent request initiated from the application, the subsequent request including a subsequent distribution constraint based on a subsequent application usage condition that is greater than the current application usage condition; and
responsive to the subsequent request, further reallocating the computing resources of the plurality of processing devices to meet the subsequent distribution constraint.

3. The method of claim 2, wherein the further reallocating includes scaling one or both of the first subset and the second subset upwards from an initial size to a scaled size that is larger than the initial size.

4. The method of claim 1, wherein the topological model represents the plurality of processing devices as a two-dimensional array of nodes.

5. The method of claim 4, wherein:
the topological model represents the first subset as a row of nodes within the two-dimensional array of nodes; and
the topological model represents the second subset as a column of nodes within the two-dimensional array of nodes.

6. The method of claim 5, wherein the first subset includes at least one node that is also included in the second subset.

7. The method of claim 1, wherein the distribution constraint specifies a relationship between a first size of the first subset and a second size of the second sub set.

8. The method of claim 1, wherein:
the plurality of processing devices are located in at least two physically distributed locations; and
the cloud-based application server provides a cloud-based processing service capable of executing the application on the plurality of processing devices, and wherein the plurality of processing devices are connected via a network to the plurality of client devices.

9. The method of claim 1, wherein the distribution constraint specifies that processing devices in the plurality of processing devices that are unspecified in the request are reprovisioned based on physical proximity to other processing devices of the plurality of processing devices.

10. The method of claim 1, further comprising defragmenting the topological model by redefining the first subset based on physically distributed locations of each of the first subset, wherein the redefining of the first subset includes selecting a set of devices that are physically located within a single rack.

11. A non-transitory machine-readable storage medium having stored thereon instructions that, in response to being executed by one or more processors of a machine, cause the machine to perform operations comprising:
receiving a request initiated from an application that is distributed across one or more of a plurality of processing devices arranged as a cloud-based application server to process requests from a plurality of client devices, the request including a distribution constraint that is based on a current application usage condition and that indicates that a first number of the plurality of processing devices executes a storage management functionality of the application, a second number of the plurality of processing devices executes an index functionality of the application, and a third number of the plurality of processing devices executes a search functionality of the application; and
responsive to the request, reallocating computing resources of the plurality of processing devices to meet the distribution constraint, the reallocating including:
accessing a topological model representative of the plurality of processing devices;
defining in the topological model a first subset of the plurality of processing devices, the first subset having a shared redundancy status;
defining in the topological model a second subset of the plurality of processing devices, the second subset having a shared functional role; and reprovisioning, based on the topological model, the one or more of the plurality of processing devices across which the application is distributed such that:

the processing devices in the second subset execute any combination of one or more types of functionality from the following group of types of functionality: the storage management functionality, the index functionality, and the search functionality consistent with the distribution constraint, and the processing devices in the first subset provide failover protection by executing any combination of one or more types of functionality from the following group of types of functionality: the storage management functionality, the index functionality, and the search functionality under the current application usage condition, in response to a failure condition detected for one of the processing devices in the second subset.

12. The non-transitory machine-readable storage medium of claim 11, wherein the operations further comprise:

receiving a subsequent request initiated from the application, the subsequent request including a subsequent distribution constraint based on a subsequent application usage condition that is greater than the current application usage condition; and responsive to the subsequent request, further reallocating the computing resources of the plurality of processing devices to meet the subsequent distribution constraint.

13. The non-transitory machine-readable storage medium of claim 12, wherein the further reallocating includes scaling one or both of the first subset and the second subset upwards from an initial size to a scaled size that is larger than the initial size.

14. The non-transitory machine-readable storage medium of claim 11, wherein the topological model represents the plurality of processing devices as a two-dimensional array of nodes.

15. The non-transitory machine-readable storage medium of claim 14, wherein:

the topological model represents the first subset as a row of nodes within the two-dimensional array of nodes; and the topological model represents the second subset as a column of nodes within the two-dimensional array of nodes.

16. The non-transitory machine-readable storage medium of claim 15, wherein the first subset includes at least one node that is also included in the second subset.

17. The non-transitory machine-readable storage medium of claim 11, wherein the distribution constraint specifies a relationship between a first size of the first subset and a second size of the second subset.

18. The non-transitory machine-readable storage medium of claim 11, wherein:

the plurality of processing devices are located in at least two physically distributed locations; and the cloud-based application server provides a cloud-based processing service capable of executing the application on the plurality of processing devices, wherein the plurality of processing devices are connected via a network to the plurality of client devices.

19. The non-transitory machine-readable storage medium of claim 11, wherein the distribution constraint specifies that processing devices in the plurality of processing devices that are unspecified in the request are reprovisioned based on physical proximity to other processing devices of the plurality of processing devices.

20. The non-transitory machine-readable storage medium of claim 11, wherein the operations further comprise defragmenting the topological model by redefining the first subset based on physically distributed locations of each of the first subset, wherein the redefining of the first subset includes selecting a set of devices that are physically located within a single rack.

* * * * *